US011904567B2

(12) United States Patent
Godden et al.

(10) Patent No.: US 11,904,567 B2
(45) Date of Patent: Feb. 20, 2024

(54) CARTON BLANK ERECTOR AND FEEDING AND SHUTTLE MACHINE

(71) Applicant: Kliklok LLC, Decatur, GA (US)

(72) Inventors: Kevin Godden, Bristol (GB); John Pate, Decatur, GA (US)

(73) Assignee: Kliklok LLC, Decatur, GA (US)

( * ) Notice: Subject to any disclaimer, the term of this patent is extended or adjusted under 35 U.S.C. 154(b) by 0 days.

(21) Appl. No.: 18/078,250

(22) Filed: Dec. 9, 2022

(65) Prior Publication Data

US 2023/0127809 A1 Apr. 27, 2023

Related U.S. Application Data

(63) Continuation of application No. 17/606,842, filed as application No. PCT/US2020/030462 on Apr. 29, 2020, now Pat. No. 11,548,254.

(60) Provisional application No. 62/840,066, filed on Apr. 29, 2019.

(51) Int. Cl.
*B31B 50/06* (2017.01)
*B31B 50/04* (2017.01)
*B31B 50/12* (2017.01)

(52) U.S. Cl.
CPC .......... *B31B 50/064* (2017.08); *B31B 50/042* (2017.08); *B31B 50/12* (2017.08)

(58) Field of Classification Search
CPC ....... B31B 50/02; B31B 50/022; B31B 50/04; B31B 50/042; B31B 50/064; B31B 50/07; B31B 50/102; B31B 50/12; B31B 2201/0241; B31B 2201/0264; B31B 2201/289; B65B 41/00; B65B 41/04; B65B 41/06; B65B 43/00; B65B 43/14; B65B 43/18
USPC ....... 493/334, 379, 84, 94, 76, 67, 344, 343; 271/35
See application file for complete search history.

(56) References Cited

U.S. PATENT DOCUMENTS 4,518,379 A * 5/1985 Eldridge ................. B29C 66/43 156/509
5,653,671 A * 8/1997 Reuteler .............. B65H 3/0808 53/381.1
8,409,064 B2 * 4/2013 Desertot ................ B31D 1/005 493/379

* cited by examiner

*Primary Examiner* — Jacob A Smith
(74) *Attorney, Agent, or Firm* — Michael S. Hargis; Stites & Harbison PLLC

(57) ABSTRACT

A carton blank feeding and shuttle machine includes a first driven belt supported by a first plurality of pulleys and a second driven belt supported by a second plurality of pulleys, a first rod attached to the first driven belt and a second rod attached to the second driven belt. Each of the rods extend across the first and second opposing sides. At least one controller controls motions of (a) the first driven belt and (b) the second driven belt, and a plucking head is supported by the first and second rods such that the first and second driven belts create common motion to move the plucking head along a transport path and relative motion to extend and retract the plucking head. A linkage assembly includes a plurality of links configured to move a plucking head along a shaft in response to movements of the first and second belts.

20 Claims, 15 Drawing Sheets

CARTON BLANK ERECTOR AND FEEDING AND SHUTTLE MACHINE

This application is a continuation of U.S. patent application Ser. No. 17/606,842 filed on Oct. 27, 2021, which is a continuation of international patent application number PCT/US2020/030462 filed on Apr. 29, 2020, which in turn claims priority from U.S. Provisional Patent Application No. 62/840,066, filed Apr. 29, 2019, the disclosures of which are incorporated herein by reference.

TECHNICAL FIELD

This document relates generally to carton blank erectors, and more specifically to a carton blank feeding and shuttle machine.

BACKGROUND

Machines for forming cartons from blanks, and then delivering a product for loading into the carton, are well known. Typically, the carton is erected from a blank during a "pick and place" operation. This movement is traditionally accomplished by using two separate feeder and shuttle mechanisms. In addition, these mechanisms traditionally support carton blank stacks in an elevated position such that the blanks are plucked and subsequently transported to a lower position for forming into cartons. This requires the carton blank stacks to be lifted into position above the machine.

Accordingly, a need exists for an improved carton blank feeding and combined shuttle machine that avoids any one or all of the foregoing limitations, and perhaps others yet to be identified.

SUMMARY OF THE INVENTION

In accordance with the purposes and benefits described herein, a carton blank feeding and shuttle machine is provided. The carton feeding and shuttle machine may be broadly described as comprising a first driven belt supported by a first plurality of pulleys attached to a first side and a second driven belt supported by a second plurality of pulleys attached to an opposing second side, a first rod attached to the first driven belt and a second rod attached to the second driven belt, each of the first and second rods extending across the first and second opposing sides, at least one controller for controlling movements of (a) the first driven belt and (b) the second driven belt, and a plucking head supported by the first and second rods such that common motion of the first and second driven belts moves the plucking head along a transport path between an initial position from which the plucking head engages a carton blank and an intermediate position from which the plucking head disengages the carton blank.

In one possible embodiment, the plucking head is further supported by the first and second rods such that relative motion of the first and second driven belts extends the plucking head from a first position to a second position from which the plucking head engages the carton blank.

In another possible embodiment, the first and second driven belts may be driven such that the plucking head extends from the first position to the second position while moving along the transport path between the intermediate position and the initial position.

In yet another possible embodiment, the first and second driven belts may be driven such that the plucking head retracts from the second position to the first position while moving along the transport path between the initial position and the intermediate position.

In still yet another possible embodiment, a first end of the first rod is attached to the first driven belt, a first end of the second rod attached to the second driven belt, and a second end of the first rod is supported for movement relative the first end of the first rod and a second end of the second rod is supported for movement relative the first end of the second rod.

In still another possible embodiment, the plucking head includes at least one linkage assembly supported by the first and second rods.

In one other possible embodiment, the plucking head includes first and second linkage assemblies supported by the first and second rods, and wherein a support bar extends between the first and second linkage assemblies and supports at least one vacuum cup attached to first and second supports associated with each linkage assembly.

In another possible embodiment, a carton blank erector is provided. The carton blank erector may be broadly described as comprising a frame supporting at least one of a carton former, a hopper supporting a plurality of cartons, a take-away conveyor, and a feeding and shuttle machine, the feeding and shuttle machine including (a) a first driven belt supported by a first plurality of pulleys attached to a first side and a second driven belt supported by a second plurality of pulleys attached to an opposing second side, (b) a first rod attached to the first driven belt and a second rod attached to the second driven belt, each of the first and second rods extending across the first and second opposing sides, and (c) a plucking head supported by the first and second rods such that common motion of the first and second driven belts moves the plucking head along a transport path between an initial position from which the plucking head engages a carton blank and an intermediate position where the plucking head disengages the carton blank, and at least one controller for controlling movements of (a) the first driven belt and (b) the second driven belt.

In one other possible embodiment, the plucking head is further supported by the first and second rods such that relative motion of the first and second driven belts extends the plucking head from a first position to a second position where the plucking head engages the carton blank.

In another possible embodiment, the plucking head includes at least one linkage assembly supported by the first and second rods and the at least one linkage assembly supports at least one vacuum cup.

In another possible embodiment, a carton blank feeding and shuttle machine is provided. The carton blank feeding and shuttle machine may be broadly described as comprising a first driven belt supported by a first plurality of pulleys attached to a first side and a second driven belt supported by a second plurality of pulleys attached to an opposing second side, a first rod attached to the first driven belt and a second rod attached to the second driven belt, each of the first and second rods extending across the first and second opposing sides, at least one controller for controlling motions of (a) the first driven belt and (b) the second driven belt, and a plucking head supported by the first and second rods such that the first and second driven belts create common motion to move the plucking head along a transport path and relative motion to extend and retract the plucking head.

In one possible embodiment, the common motion moves the plucking head along a reciprocating transport path between an initial position from which the plucking head engages a carton blank and an intermediate position from which the plucking head disengages the carton blank.

In another possible embodiment, the carton blank feeding and shuttle machine of claim 12, wherein the relative motion extends the plucking head from a first position to a second position from which the plucking head engages a carton blank.

In yet another possible embodiment, the carton blank feeding and shuttle machine of claim 13, wherein the first and second driven belts may be driven such that the plucking head extends from the first position to the second position while moving along the transport path between the initial and intermediate positions.

In still yet another possible embodiment, the carton blank feeding and shuttle machine of claim 13, wherein the first and second driven belts may be driven such that the plucking head retracts from the second position to the first position while moving along the transport path between the initial and intermediate positions.

In still another possible embodiment, a first end of the first rod is attached to the first driven belt, a first end of the second rod attached to the second driven belt, and a second end of the first rod is supported for movement relative the first end of the first rod and a second end of the second rod is supported for movement relative the first end of the second rod.

In one other possible embodiment, the plucking head includes at least one linkage assembly supported by the first and second rods.

In yet another possible embodiment, the plucking head includes first and second linkage assemblies supported by the first and second rods, and wherein a support bar extends between the first and second linkage assemblies and supports at least one vacuum cup attached to first and second supports associated with each linkage assembly.

In still yet another possible embodiment, the relative motion extends the plucking head from a first position to a second position from which the vacuum cup engages a carton blank.

In yet one other possible embodiment, the carton blank feeding and shuttle machine further includes a first drive supported by the first side for moving the second driven belt and a second drive supported by the second side for moving the first driven belt.

In the following description, there are shown and described several embodiments of carton feeding and shuttle machines, carton blank erectors including the carton feeding and shuttle machine, and related methods. As it should be realized, the erectors and machines are capable of other, different embodiments and their several details are capable of modification in various, obvious aspects all without departing from the machines as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the carton blank erectors, feeding and shuttle machines, and related methods and together with the description serve to explain certain principles thereof. In the drawing figures.

Figure 9:
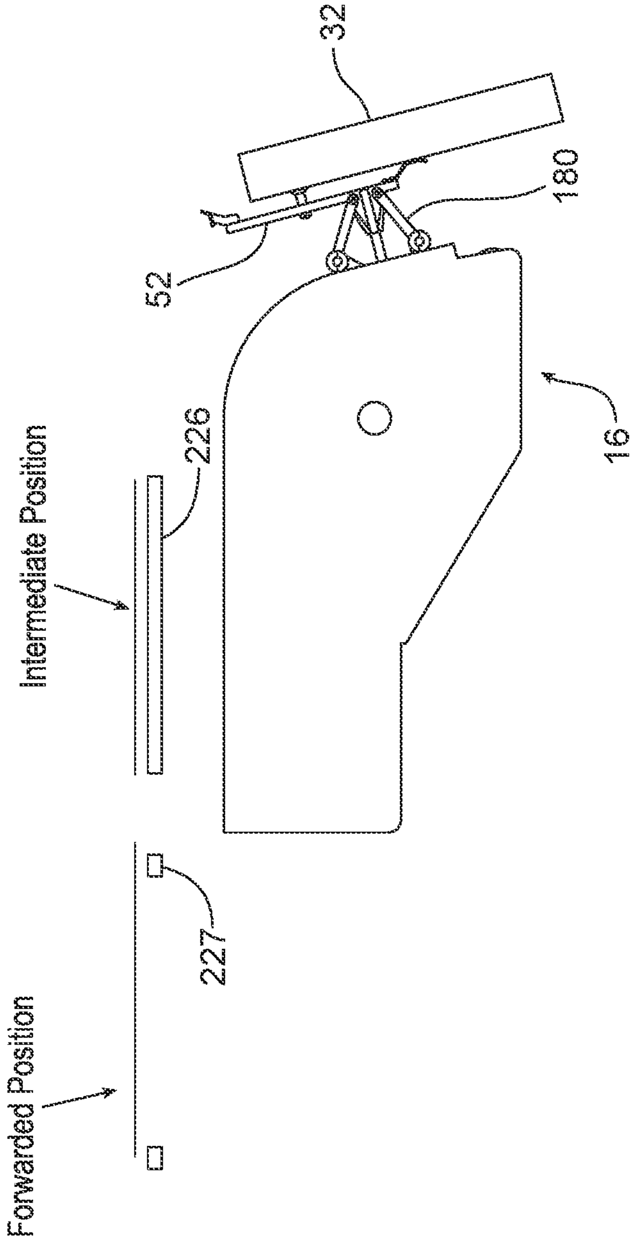

FIG. 9 is a section view of relevant portions of the erector and the carton feeding and shuttle machine illustrating an extended linkage assembly and corresponding plucking head engaging a next-in-line carton of a carton stack in a plucking position; and FIGS. 10A-10F are sequential section views of relevant portions of the erector and the carton feeding and shuttle machine illustrating movement of a linkage assembly and corresponding plucking head through a complete cycle of movement from a plucking position, toward an intermediate position above the carton feeding and shuttle machine, past the intermediate position pushing an intermediate-position-carton toward a forward position, and back to the plucking position.

Reference will now be made in detail to the present embodiments of the carton feeding and shuttle machine and related methods of staging a carton for subsequent forming, examples of which are illustrated in the accompanying drawing figures, wherein like numerals are used to represent like elements.

DETAILED DESCRIPTION

Figure 1:
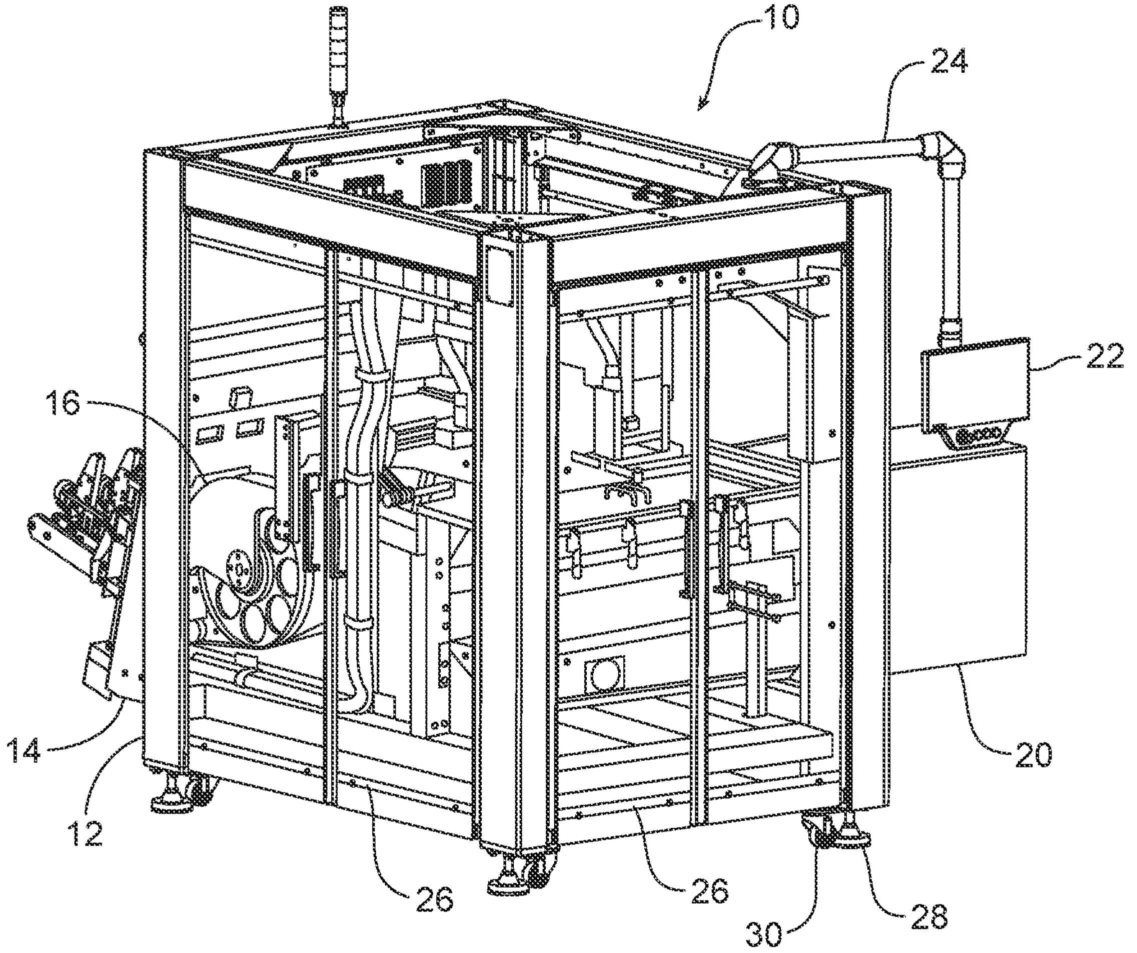
FIG. 1 is a perspective view of a carton blank erector.

Reference is now made to FIG. 1 which illustrates an overall perspective view of one embodiment of a carton blank erector 10. While the term carton blank describes a typically flat material which is formed into a carton, carton blanks will simply be referred to as cartons throughout the specification. As shown in both FIGS. 1 and 2, the carton erector 10 includes a frame 12 supporting a hopper 14, a carton feeding and shuttle machine 16, a carton former 18 including a takeaway conveyor 20, and an input device 22 mounted on an extendable arm 24. As is known in the art, a plurality of see-through doors 26 are positioned on each side of the frame 12 other than the hopper side. The plurality of see-through doors 26 minimize the risk of an object entering a carton erecting area (generally within the frame 12) while allowing operator(s) to visually monitor the carton feeding, shuttling, and forming operations occurring within the area. As shown, the frame 12 is supported by extendable, leveling feet 28 at each corner and casters 30. The feet 28 support the erector 10 in a stationary position during use, shipment, or storage and the casters 30 support the erector for movement during non-use. In some embodiments, the casters may be retractable and/or one or more locking casters may be utilized in lieu of feet, or the erector may utilize solely feet, or neither.

Figure 3:
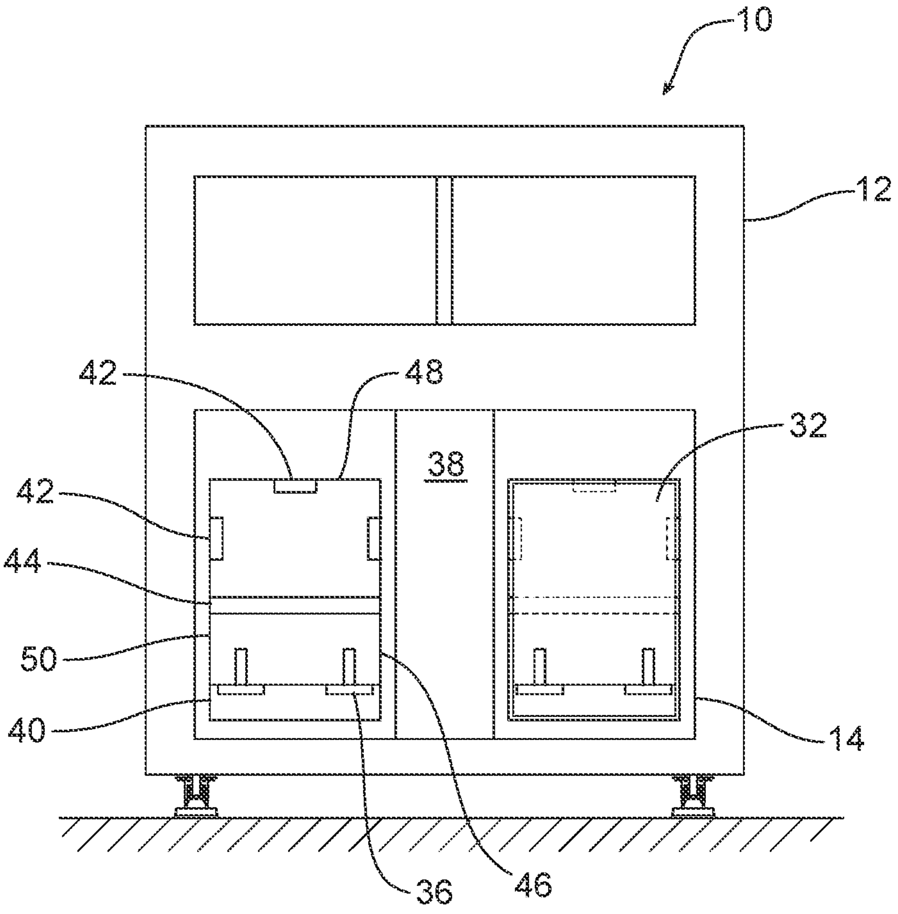
FIG. 3 is an end plan view of a carton blank erector illustrating a hopper configured to support first and second carton blank stacks and shown supporting a second carton blank stack on a right-side of the hopper.

As shown in FIG. 3, the hopper 14 is an ergonomic low-level hopper configured to support first and second carton stacks 32 such that a next-in-line carton can be picked or plucked from a side of the stacks facing the carton feeding and shuttle machine 16. In other words, the next-in-line carton is picked from a bottom of the carton stacks 32. In other embodiments, fewer or more carton stacks may be supported by the hopper 14. In one embodiment, for example, an erector with three carton stacks may be utilized. In such an arrangement, as with the described two stack embodiment, the carton feeding and shuttle machine acts to pluck, move, and form a carton from each stack in a combined operation. In this manner, the erector 10 can form two, three or more times as many cartons compared to an erector with a single carton stack. The remainder of the description, however, will treat the erector 10 as if its hopper 14 supports a single carton stack 32.

As further shown, a plurality of guides 36 extend generally perpendicular to a face 38 of the hopper 14. The guides 36 guide the cartons in the carton stack 32 into position during placement onto the hopper 14 and limit lateral movement of the cartons during operation. A hopper tray 40 in combination with one or more tabs 42 and a roller bar 44 support the carton stack 32 in position on the hopper 14. More specifically, the tray 40 prevent the cartons within the carton stack 32 from sliding down the hopper face 38 and the one or more tabs 42 and roller bar 44 prevent the carton stack from falling through a generally rectangular or other carton-shaped aperture 46 defined by the hopper face through which a next-in-line carton travels when plucked or pulled from the carton stack.

The roller bar 44 extends across the aperture 46 in the hopper face 38 and between a lower edge of the aperture (not visible in FIG. 3 due to the tray 40) and a midway point and, in the described embodiment, is positioned about one fourth of the total height of the aperture above the lower edge. In this arrangement, the one or more tabs 42 are positioned along an upper edge 48 and side edges 50 of the aperture. The one or more tabs 42 extend into the aperture 46 sufficient to prevent the carton stack 32, including the next-in-line carton, from falling through the aperture. In the described embodiment, the one or more tabs 42 extend into the aperture 46 approximately one quarter of an inch or so. In operation, one or more plucking heads 52 grasps an upper portion of the next-in-line carton pulling a flexing upper portion thereof past the one or more tabs 42 and through the aperture 46 while a lower portion of the next-in-line carton flexes horizontally around the roller bar 44. As the carton feeding and shuttle machine 16 moves the plucking heads 52 and the next-in-line carton from its initial position within the carton stack 32 toward an intermediate position, the next-in-line carton is pulled upward, through the aperture 46, and away from the carton stack 32. This plucking action and carton movement is described in greater detail below.

Figure 2:
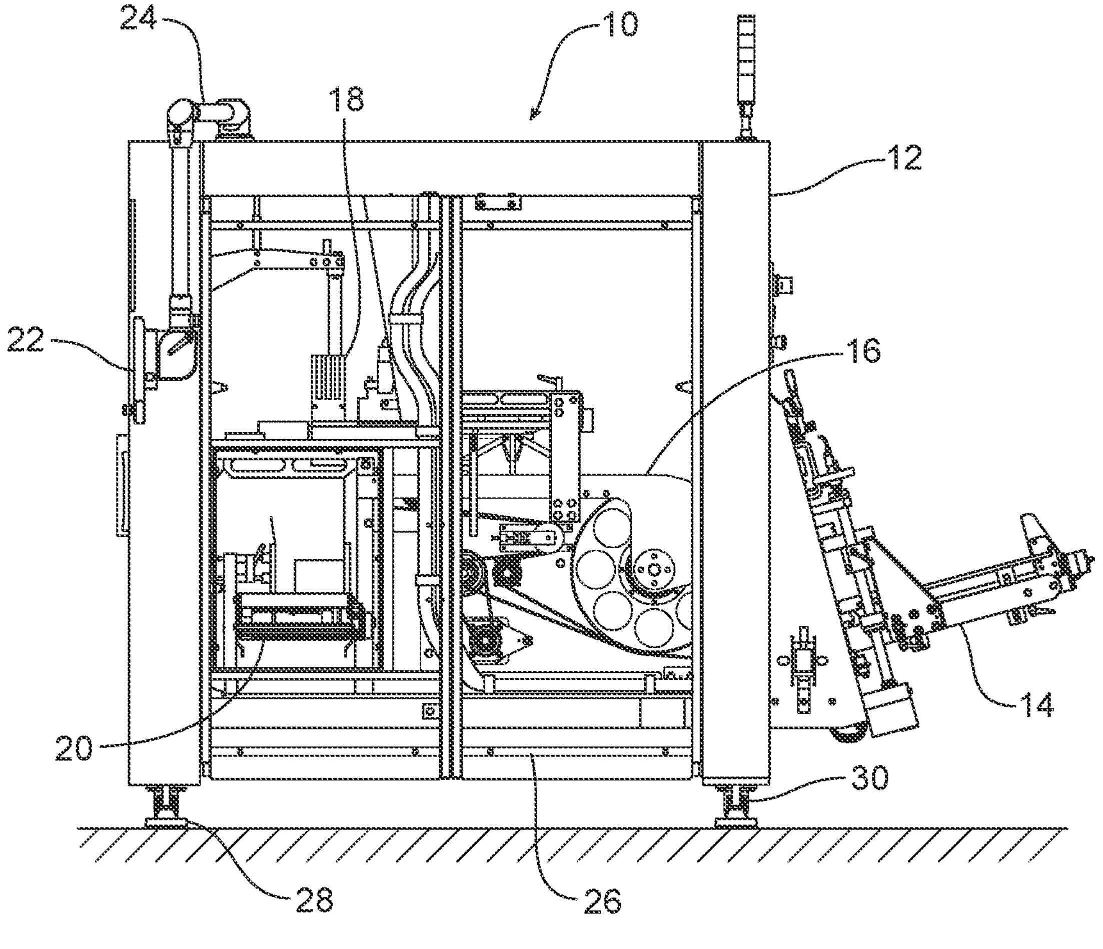
FIG. 2 is a side plan view of a carton blank erector.
Figure 4:
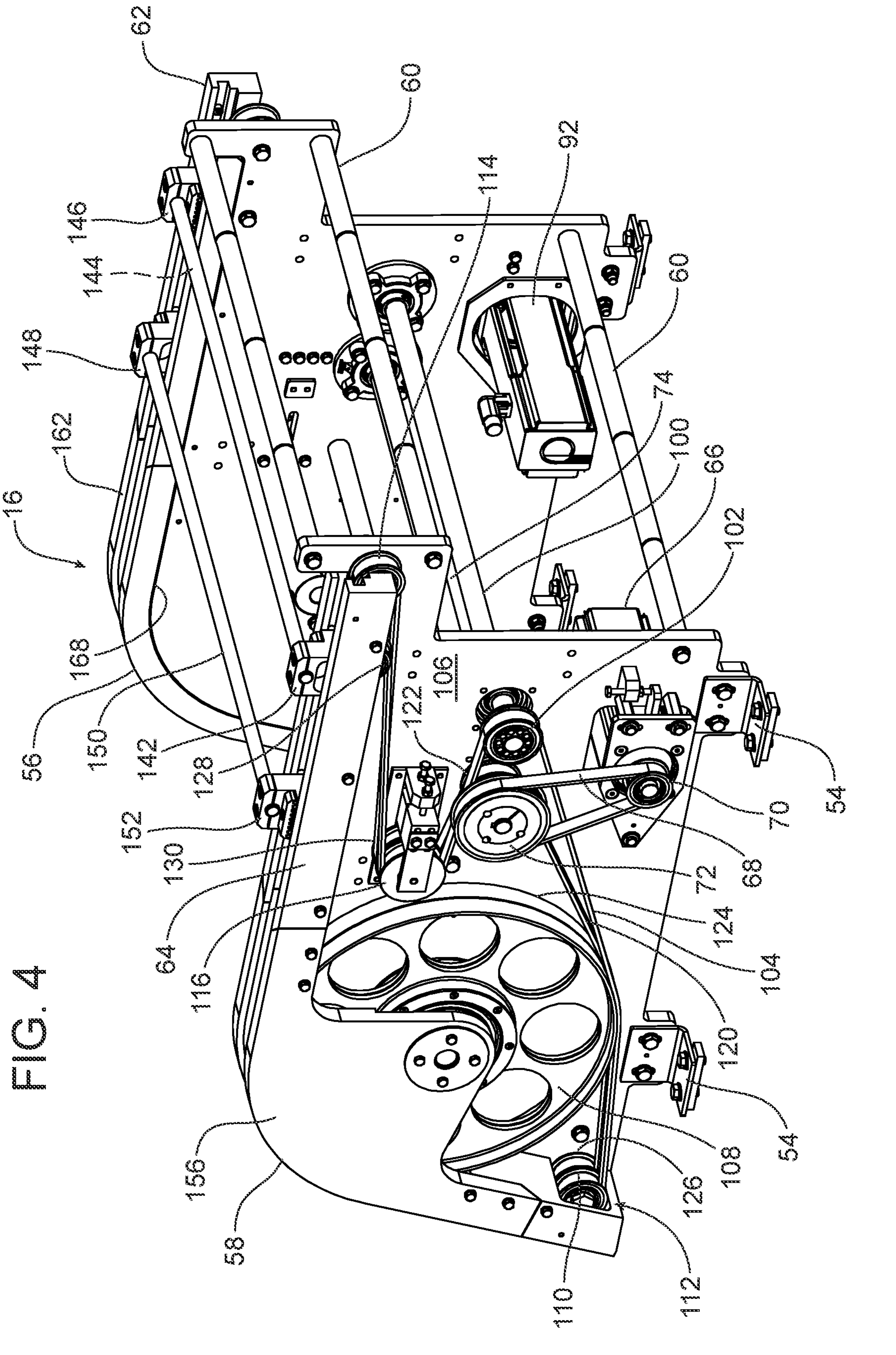
FIG. 4 is a perspective view of a carton feeding and shuttle machine with carton plucking heads and corresponding linkage assemblies removed.

FIG. 4 illustrates a perspective view of the carton feeding and shuttle machine 16 which is supported by the frame 12 as shown in FIGS. 1 and 2. In the described embodiment, a plurality of angle brackets 54 are used to attach the carton feeding and shuttle machine 16 to corresponding supports of the frame 12 using bolts or other fastening means. Returning to FIG. 4, the carton feeding and shuttle machine 16 includes opposing sides 56, 58 attached together via a plurality of static rods 60 extending therebetween. In other embodiments, the rods may be square or L-shaped bars, or any other shaped rigid material and the length thereof may vary as well depending on a desired width of the carton feeding and shuttle machine 16. The opposing sides 56, 58 are essentially mirror images of one another in the described embodiment but work together to create motion and relative motion for control of the plucking heads 52 as will be described in greater detail below.

As shown, side 58 of the carton feeding and shuttle machine 16 supports a first servo drive 66 which drives a timing belt 68. More specifically, a drive shaft of servo drive 66 extends through a first timing belt pulley 70. Rotation of the drive shaft imparts motion to the first timing belt pulley 70 and timing belt 68 which in turn rotates a second timing belt pulley 72. Rotation of the second timing belt pulley 72 rotates a transfer shaft 74 extending between sides 56 and 58, causing rotation of a drive pulley 76 supported by side 56, shown in FIG. 5.

Figure 5:
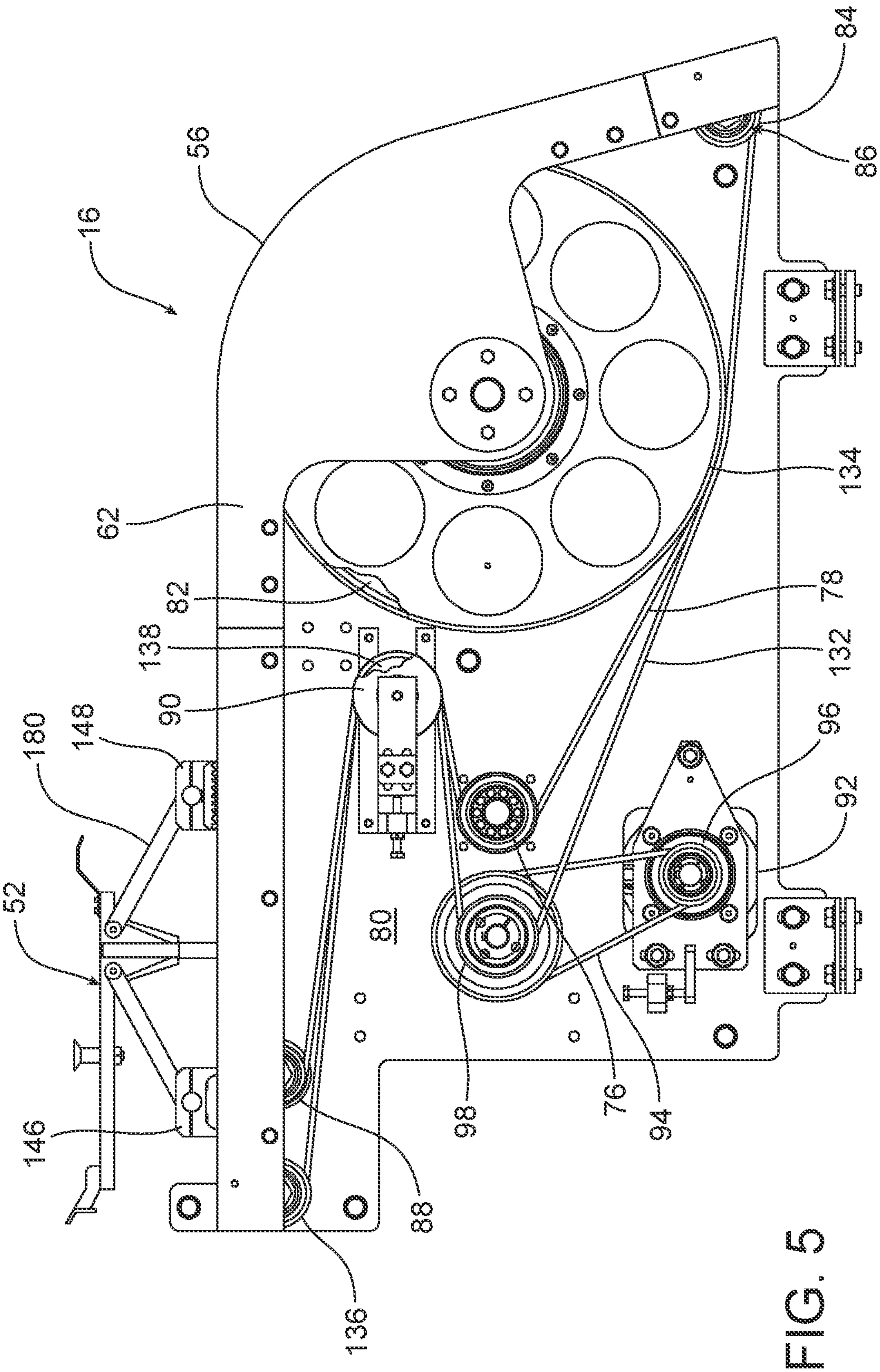
FIG. 5 is a side plan view of the carton feeding and shuttle machine.

As further shown in FIG. 5, rotation of the drive pulley 76 moves a drive belt 78 along a circuitous path adjacent a sidewall 80 of side 56. The drive belt path extends from drive pulley 76 along a guide wheel 82, a first idler pulley 84 of a double idler pulley 86, back along the guide wheel, through a guide rail 62, around idler pulley 136 and tensioner pulley 90, and back to the drive pulley. Also shown in FIG. 5, side 56 supports a second servo drive 92 which drives a timing belt 94. Again, a drive shaft of servo drive 92 extends through a first timing belt pulley 96. Rotation of the drive shaft imparts motion to the first timing belt pulley 96 and timing belt 94 which in turn rotates a second timing belt pulley 98. Rotation of the second timing belt pulley 98 rotates a transfer shaft 100, extending between sides 56 and 58, causing rotation of a drive pulley 102 supported by side 58, shown in FIG. 4.

Staying with FIG. 4, rotation of the drive pulley 102 moves a drive belt 104 along a circuitous path adjacent a sidewall 106 of side 58. The drive belt path extends from drive pulley 102 along a guide wheel 108, a first idler pulley 110 of a double idler pulley 112, back along the guide wheel, through a guide rail 64, around idler pulley 128 and tensioner pulley 116, and back to the drive pulley.

Rotation of the second timing belt pulley 72 caused by movement of the timing belt 68 also imparts motion to a third belt 120 along a different circuitous path adjacent the sidewall 106 of side 58. The third belt path extends from pulley 122 along a guide wheel 124, a second idler pulley 126 of the double idler pulley 112, back along the guide wheel, through the guide rail 64, around idler pulley 114 and a tensioner pulley 130, and back to the pulley 122. Similarly, as shown in FIG. 5, rotation of the second timing belt pulley 98 caused by movement of the timing belt 94 also imparts motion to a fourth belt 132 along another circuitous path adjacent the sidewall 80 of side 56. The fourth belt path extends from a pulley, not shown but positioned between the second timing belt pulley 98 and the sidewall 80 on shaft 100, along a guide wheel 134, a second idler pulley of the double idler pulley 86, back along the guide wheel 134, through the guide rail 62, around idler pulley 88 and a second tensioner pulley 138, and back to the pulley positioned between the second timing belt pulley 98 and the sidewall 80 on shaft 100.

Figure 6:
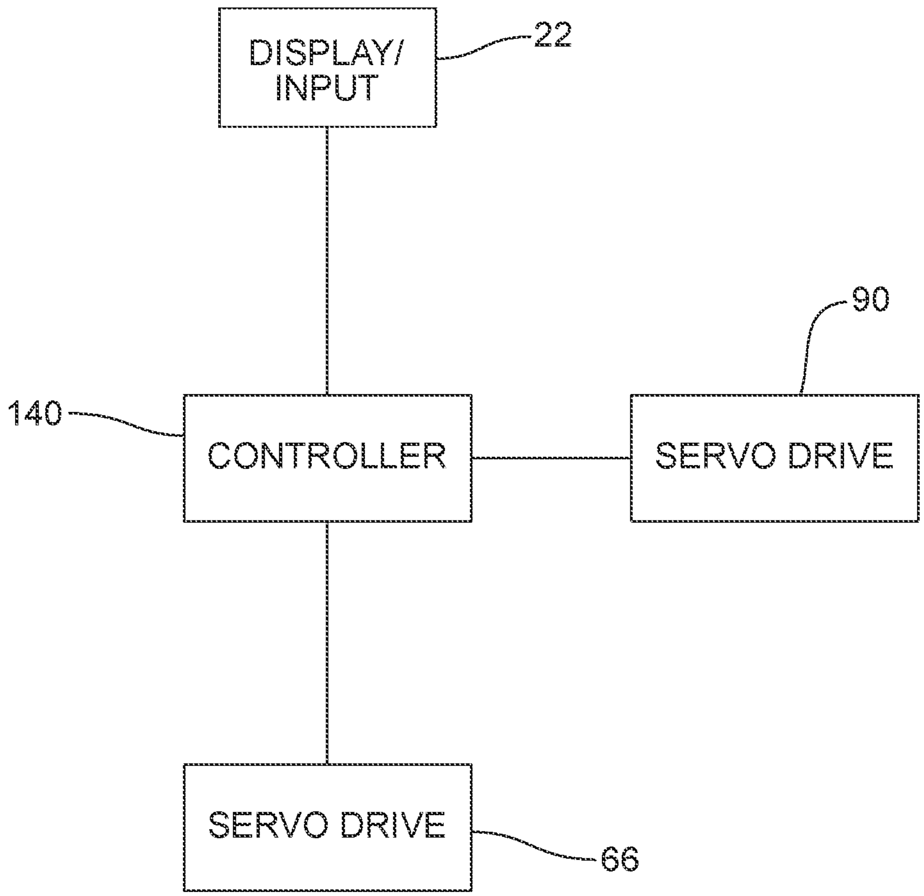
FIG. 6 is a schematic block diagram including a user display/input, a controller, and first and second servo drives.

As is known in the art, the servo drives 66 and 90 are utilized to provide precise location control for the first and second (drive) belts 78 and 104, via timing belts 94 and 68 respectively, throughout use. As schematically illustrated in FIG. 6, the servo drives 66 and 90 receive command signals from a controller 140/control system, amplify the signals, and transmit electric currents to servo motors of the servo drives in order to produce motion proportional to the command signals which, in this instance, represent desired positions. The command signals may be generated via user input through input device 22, for example, or other input.

In the described embodiment, the input device 22 is a touch screen display. As suggested and described above, each of the first and second drive belts 78 and 104 is individually servo driven via its respective timing belt. However, the drive belts work together to create the motion and the relative motion for control of the plucking heads 52 mentioned above and described in more detail below.

Figure 7:
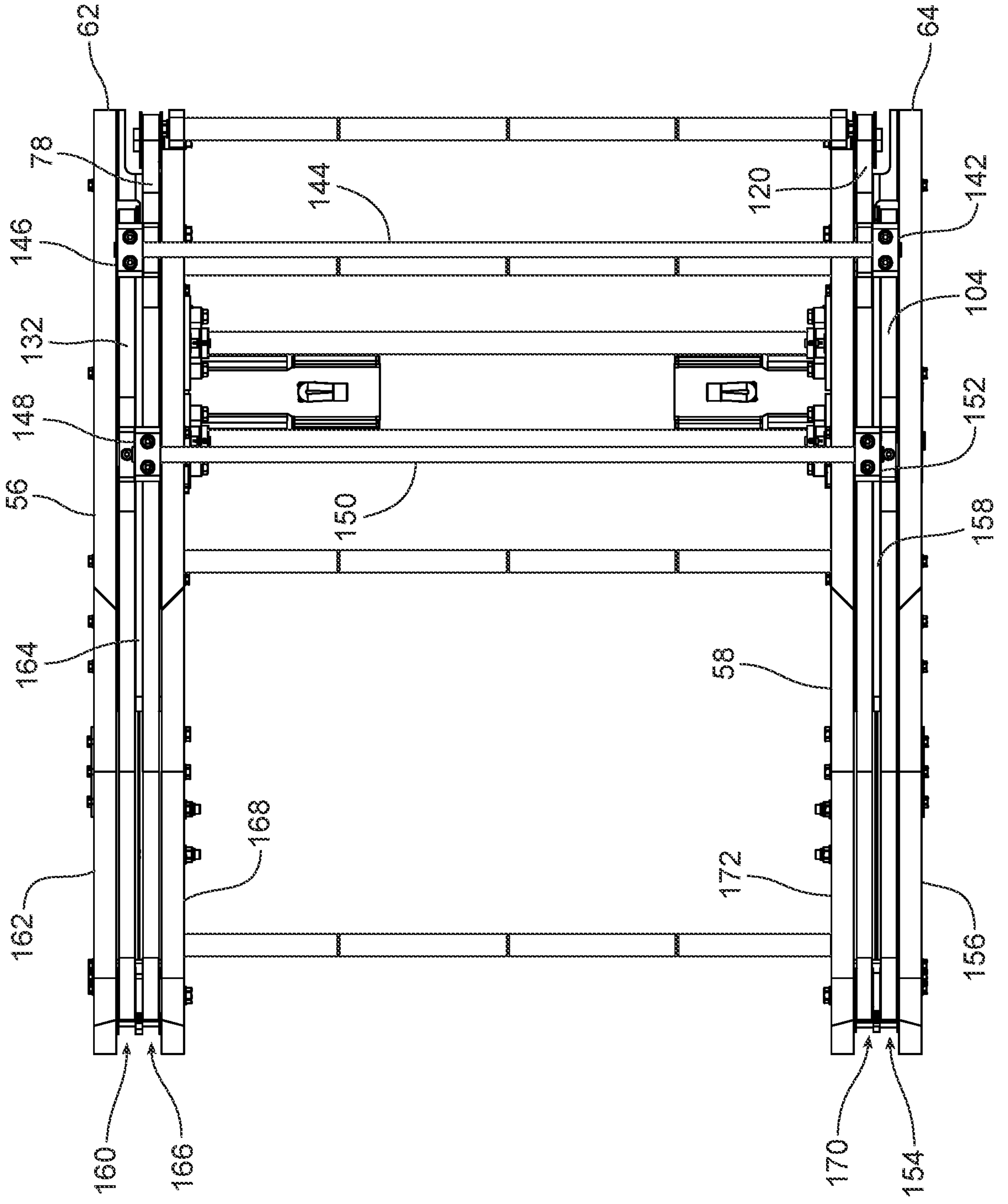
FIG. 7 is a top view of the carton feeding and shuttle machine with carton plucking heads and corresponding linkage assemblies removed.

As best shown in FIG. 7, a pivot block 142 is attached to drive belt 104 for movement therewith within a guide track 154. The guide track 154 extends within the guide rail 64 between an outer wall 156 and a divider 158. The divider 158 extends between the guide tracks 154 and 170 to ensure separation of the belts 104 and 120 during movement through the guide rail 64. A support rod 144 extends between pivot block 142 and a corresponding pivot block 146 attached to belt 132 such that the pivot blocks 142 and 146 form a first pivot block pair. Pivot block 146 is similarly attached to drive belt 132 for movement therewith within a guide track 160 that extends within the guide rail 62 between an outer wall 162 and a divider 164.

As further shown, another pivot block 148 is attached to drive belt 78 for movement therewith within a guide track 166. The guide track 166 extends within the guide rail 62 between an inner wall 168 and the divider 164. The divider 164 extends between the guide tracks 160 and 166 to ensure separation of the belts 132 and 78 during movement through the guide rail 62. A support rod 150 extends between pivot block 148 and a corresponding pivot block 152 attached to belt 120 such that the pivot blocks 148 and 152 form a second pivot block pair. Pivot block 152 is similarly attached to drive belt 120 for movement therewith within a guide track 170 that extends within the guide rail 64 between an inner wall 172 and the divider 158.

Figure 8:
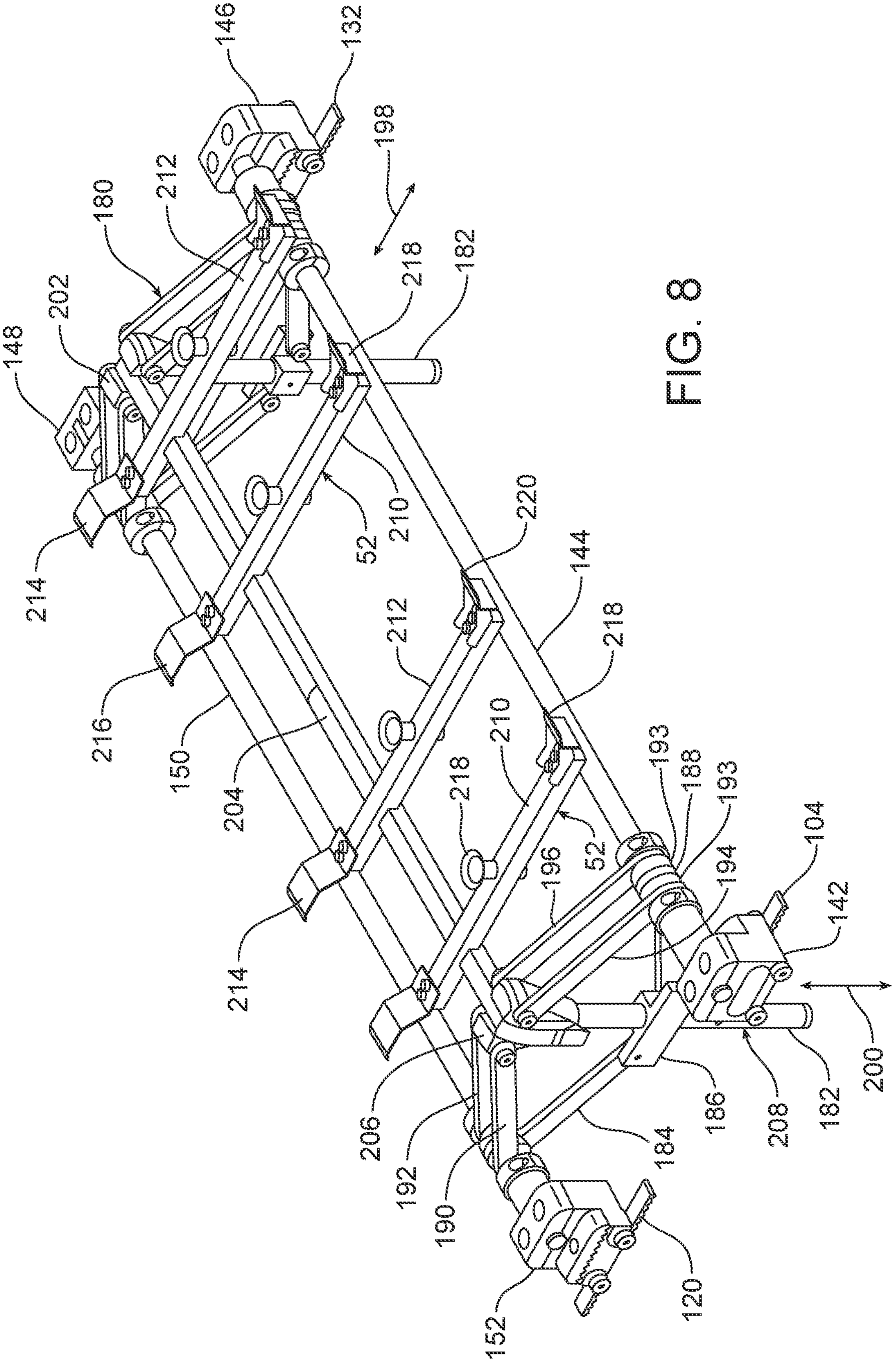
FIG. 8 is a perspective view of the carton plucking heads and corresponding linkage assemblies supported by support rods and corresponding pivot blocks of the carton feeding and shuttle machine.

In operation, common motions of the servo drives 66 and 90 move the first and second pairs of opposing pivot blocks to create motion to move the plucking heads 52 along a transport path while small differences in motion between the servo drives 66 and 90 move the first and second pairs of opposing pivot blocks to create relative motion to control the plucking heads 52 via a corresponding one or more linkage assemblies 180. In the described embodiment shown in FIG. 8, the carton feeding and shuttle machine 16 utilizes two plucking heads 52 and corresponding linkage assemblies 180 for plucking cartons from the first and second carton stacks 32. Each plucking head 52 and corresponding linkage assembly 180 are the same and only one such head and assembly will be described in detail. As noted above, however, one or more plucking heads and corresponding linkage assemblies may be used in different embodiments of the invention.

As shown, the linkage assembly 180 includes a plurality of links interconnected to pivot about the support rods 144 and 150. In the described embodiment, six links are interconnected, however, alternate embodiments may utilize fewer or more links to achieve the desired motion along a shaft 182. As shown, a first link 184 is supported by or attached to a base 186 at a first end and supported by support rod 150 at a second end. Similarly, a second link 188 is supported by or attached to the base 186 at a first end and supported by support rod 144 at a second end. Third and fifth links 190, 192 are supported at first ends by support rod 150.

The support rod 150 extends through apertures in the first ends of the third and fifth links 190, 192 and the second end of the first link 184 such that the second end of the first link 184 is essentially sandwiched between the first ends of the third and fifth links. Spacers 193 may be positioned along rod 150 between the links 184, 190, and 192. Similarly, third and sixth links 194, 196 are supported at first ends by support rod 144. The support rod 144 extends through apertures in the first ends of the third and sixth links 194, 196 and the second end of the second link 188 such that the second end of the second link 188 is essentially sandwiched between the first ends of the third and sixth links. Again, spacers 193 may be positioned along rod 144 between the links 188, 194, and 196. Second ends of the third and fifth links 190, 192 and second ends of the third and sixth lengths 194, 196 are attached to or supported by a head 202 attached to the shaft 182.

A support bar 204 extends between head 202 of the first linkage assembly 180 and a head 206 of a second linkage assembly 208. As shown, the support bar 204 supports first and second plucking heads 52. In the described embodiment, each plucking head 52 includes first and second supports 210 and 212 for supporting the next-in-line carton throughout transport, push arms 214 and 216 for moving a carton in an intermediate position to a forward position, and support arms 220 and 222. Each plucking head 52 further includes at least one vacuum tool or vacuum cup 218 for grasping the next-in-line carton as is known in the art. Although some type of vacuum hose(s) or line(s) is attached to each cup to apply a facility provided vacuum or suction force to a face of the next-in-line carton upon engagement in order to grasp the carton, the hose(s) or line(s) are not shown for clarity. In the described embodiment, each of the first and second supports 210 and 212 support a vacuum cup 218.

As suggested throughout, relative movement of at least one of the pivot block pairs (shown by action arrows 198) within their respective guide rails causes rotation of the links about the support rods 144, 150 resulting in movement of the shaft 182 and heads 202 and 206 (shown by action arrows 200). More specifically, the shaft 182 travels through the base 186 drawing the heads 202 and 206 closer to or pushing the heads away from the base. This movement allows the plucking heads 52 to move from a first to a second position. In the described movement, the plucking heads 52 extend from the first position toward the next-in-line carton to the second or plucking position for plucking. Further movement allows the plucking heads 52 to retract to allow unfettered movement of the plucking heads and plucked carton between an initial position where the carton is a part of the carton stack 32 and the intermediate position where the carton is released from the plucking heads onto a tray.

In the plucking position, as shown in FIG. 9, the plucking head 52 is extended such that the vacuum cup 218 is engaging or grasping the next-in-line carton in its initial position within the carton stack 32. It should be noted that an amount of extension of the plucking head 52 and/or various stop positions along the path may be adjusted, as noted above, through operator intervention, whilst the carton feeding and shuttle machine is cycling or otherwise, to accommodate variations within the system (e.g., bowed carton compensation). For instance, an operator may adjust an extension length of the plucking head 52 utilizing "up" and "down" arrows shown on the input device 22 to accommodate bowing of cartons within the carton stacks 32 or other less than optimal conditions.

Figure 10A:
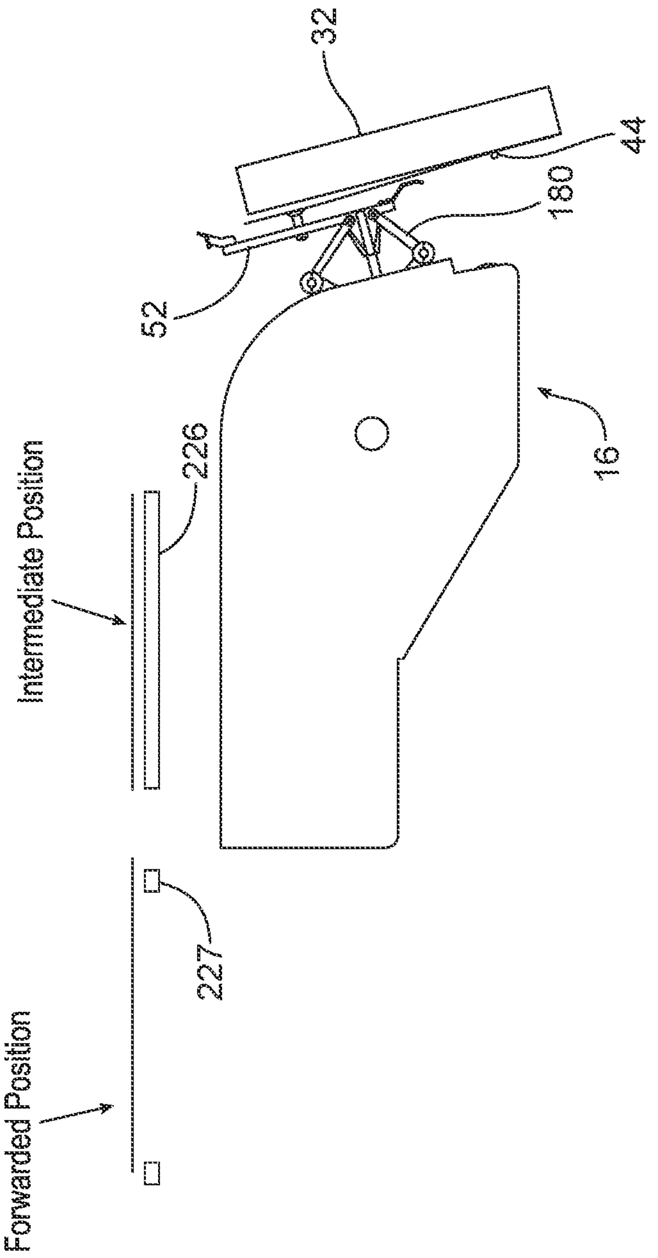

As described above, the plucking head 52 engages and grasps an upper portion of the next-in-line carton in the plucking position as illustrated in FIG. 10A. Once engaged, the plucking head 52 is retracted along shafts 182 via relative movement of the pivot blocks pairs. This movement pulls the flexing upper portion of the next-in-line carton past the tabs 42 and through the aperture 46 while the lower portion of the next-in-line carton flexes horizontally around the roller bar 44. The servo drives 66 and/or 92 ensure that the plucking head 52 is generally perpendicular to a contact face of the carton blank being plucked.

Figure 10B:
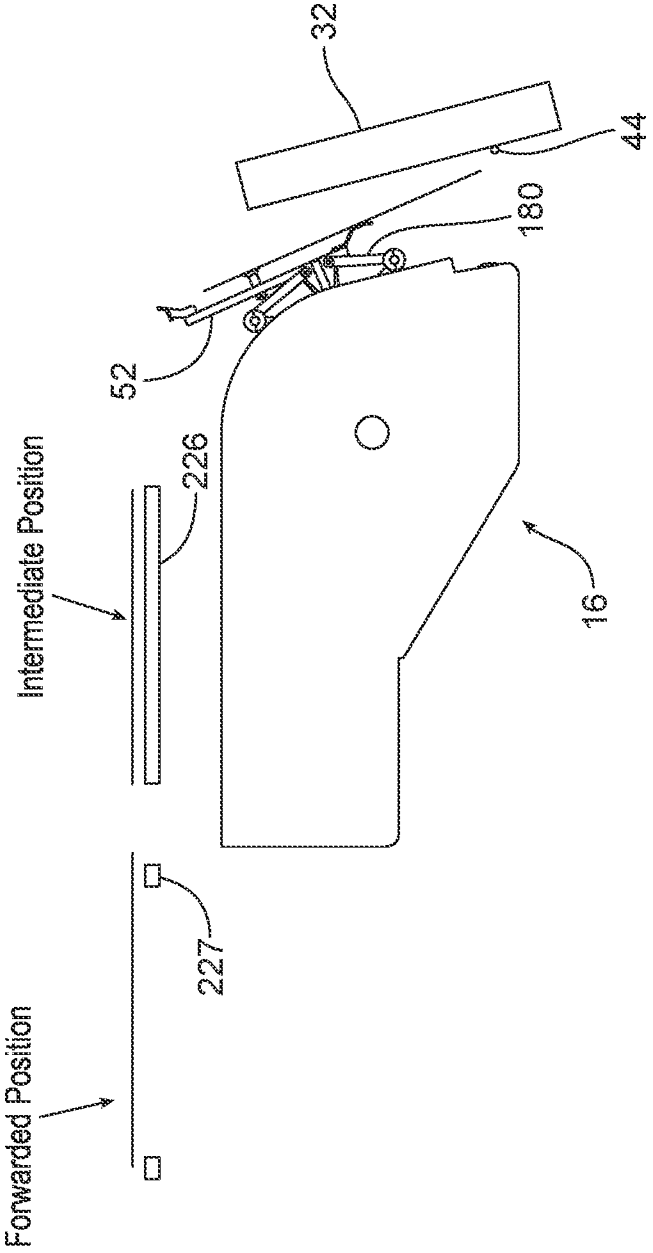

Once at least the upper portion of the next-in-line carton is pulled through the aperture 46 or simultaneously therewith, the carton feeding and shuttle machine 16 initiates movement of the linkage assemblies 180, the plucking head 52, and the grasped carton toward an intermediate position as illustrated in FIG. 10B. In the described embodiment, the intermediate position is resting upon a support tray 226 positioned above the carton feeding and shuttle machine 16 and generally horizontal as illustrated in FIG. 9. Moving the linkage assemblies 180 and plucking head 52 necessarily moves the grasped carton pulling the lower portion over the roll bar 44 and through the aperture 46. Retraction of the plucking head 52 from the plucking position continues throughout this movement at least sufficient to allow a lower end of the next-in-line carton pulled through the aperture to avoid contacting the hopper 14 and/or a subsequent next-in-line carton in the carton stack 32 as shown in FIGS. 10B and 10C.

Figure 10C:
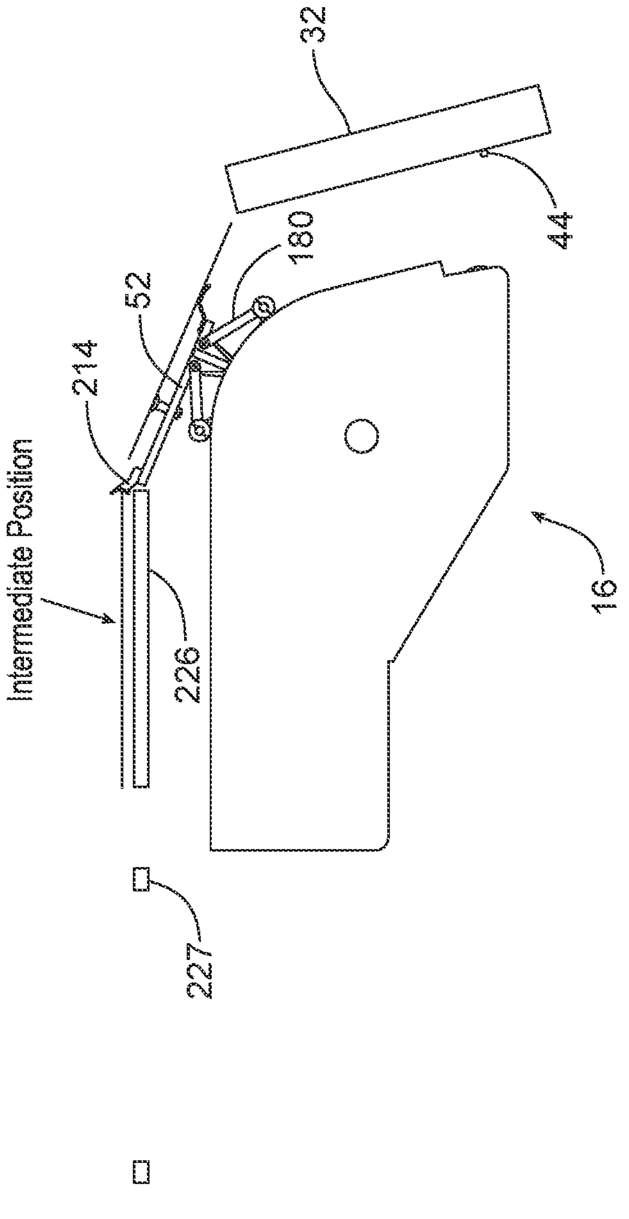

As further illustrated in FIG. 10C, the next-in-line carton is transported along a transport path from its initial position toward the intermediate position where support tray 226 is already supporting an intermediate-position-carton. As the plucking head 52 and carton-in-transport approach the intermediate position, the linkage assemblies 180 extend to raise the carton-in-transport above the tray 226 and the push arms 214 and 216 positioned along a leading edge of the plucking head 52 engage the intermediate-position-carton pushing the carton from the support tray 226 and toward a forward position as shown in FIG. 4 and sequentially illustrated in FIGS. 10C and 10D. In the forward position, the erector 10 can perform one or more next machine functions such as forming the carton and subsequently conveying the formed carton away from the erector. These machine functions are generally represented in FIGS. 10A-10F by reference numeral 227. Take-away conveyor belts and carton forming machines, or machines for performing other functions within the carton forming process are generally known in the art and will not be described in detail herein. It should be noted, however, that glue nozzles 228 may be positioned adjacent the support tray 226 for depositing glue or adhesive onto passing cartons in support of the forming function as is known in the art. Even more, water nozzles may be positioned where the glue nozzles 228 are shown adjacent the support tray 226 and other components and/or tooling for sealing cartons using ultrasonic methods as is also known in the art may also be utilized.

Figure 10D:
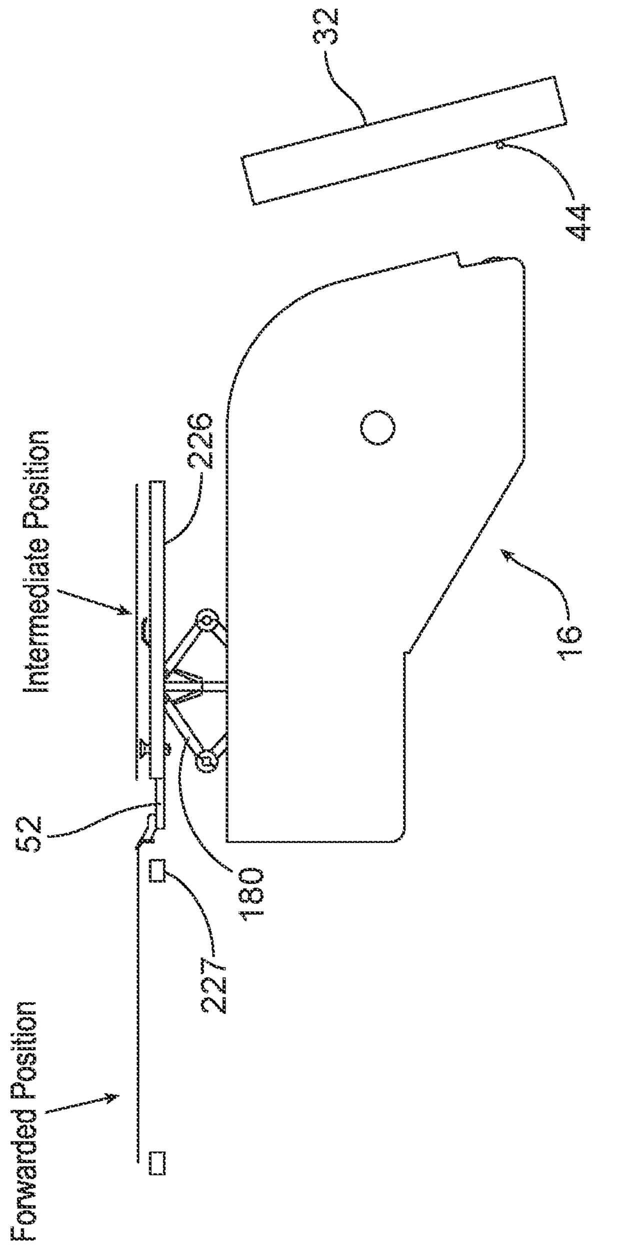
Figure 10E:
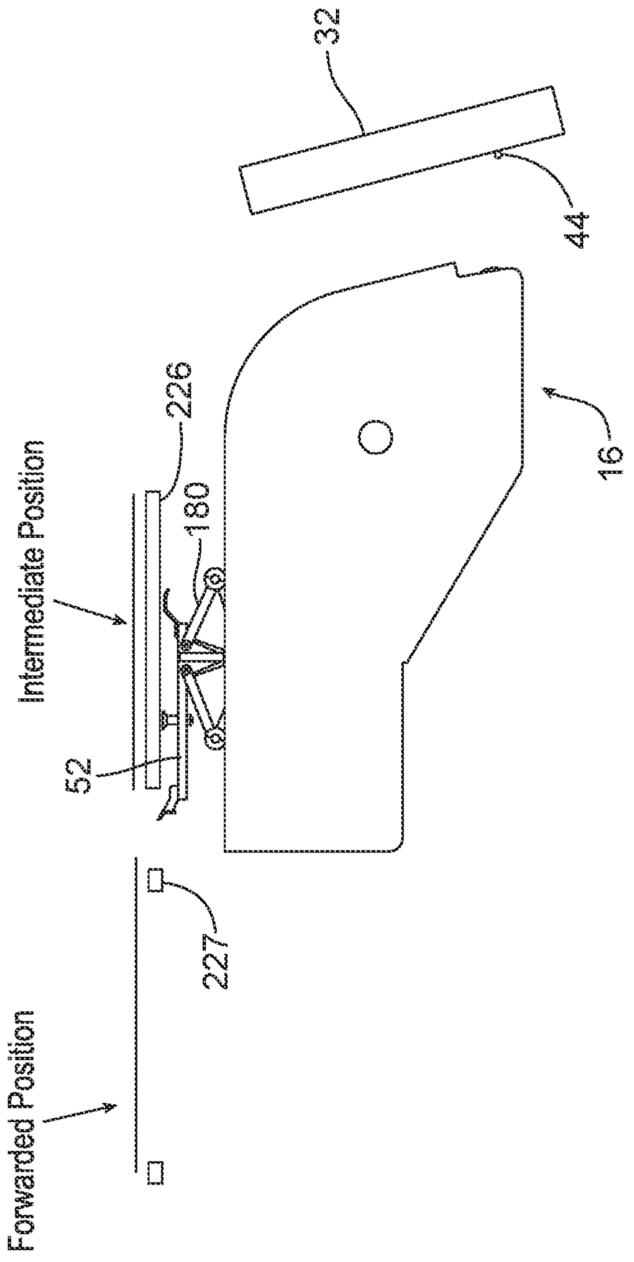
Figure 10F:
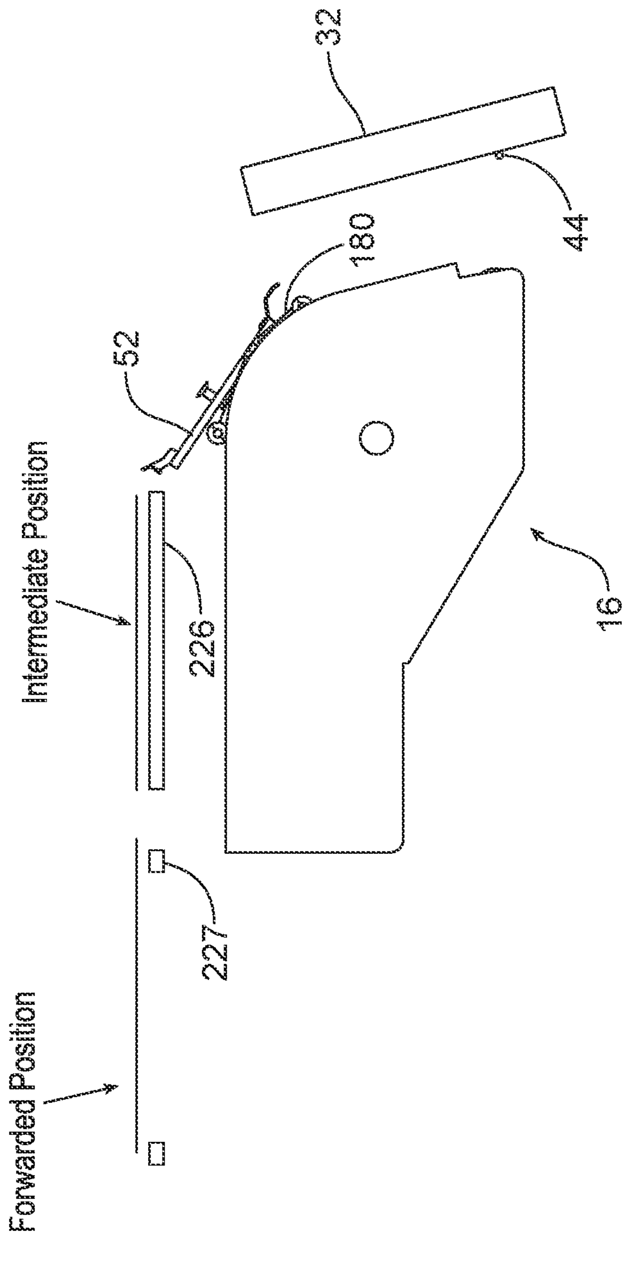

Reiterating, the plucking head 52 is moved and retracted pulling the next-in-line carton through the aperture 46 and clear of the next-in-line carton and the hopper 14. Subsequently, the plucking head 52 is extended while moving the carton-in-transport along the transport path sufficient to clear the support tray 226. With the carton-in-transport in position above the support tray 226 and having pushed the intermediate-position-carton toward the forward position, the vacuum pressure is removed from the vacuum cups 52 releasing the carton-in-transport onto the support tray in the intermediate position. As the carton-in-transport is released, becoming a subsequent intermediate-position-carton, the plucking head 52 continues moving forward along the transport path in engagement with and pushing the intermediate-position-carton to the forward position as illustrated in FIGS. 10D and 10E. The actions of initially engaging and pushing the intermediate-position-carton toward the forward position, releasing the carton-in-transport onto the support tray 226, and continuing to engage and push the intermediate-position carton to the forward position occur in a generally continuous manner such that the movement appears fluid.

With the intermediate-position-carton pushed to the forward position, the plucking head 52 is subsequently retracted enough to allow the push arms 214 and 216 to clear the support tray 226 during return travel along the transport path back toward the carton stack 32 where the cycle of movement is repeated and a subsequent next-in-line carton is engaged and transported along the transport path to the intermediate position. It should be noted that the path the carton travels during operation produces an ergonomic low-level carton hopper position combined with the servo control that allows for infinitely changeable carton pick and shuttle programmed positions. In this manner, the machine can be used with varying other cartoning equipment as well as varying sizes of cartons. A motion profile for the plucking head 52 may be configured for each individual carton blank size, shape, style, etc. One or more such profiles may be saved in a memory within or associated with the controller 140 for use in future scenarios when the same carton blank is utilized again.

The foregoing has been presented for purposes of illustration and description. It is not intended to be exhaustive or to limit the embodiments to the precise form disclosed. Obvious modifications and variations are possible in light of the above teachings. For example, the described embodiment utilizes two linkage assemblies 180 and two vacuum cups 214 per plucking head 52 while alternate embodiments may include one, three, or four similar linkage assembly/plucking head arrangements positioned along the support rods 144 and 150 allowing the transportation of one or more cartons in each cycle. Of course, corresponding support trays, glue nozzles, and other components would be required including multiple carton stacks and a suitably modified hopper. All such modifications and variations are within the scope of the appended claims when interpreted in accordance with the breadth to which they are fairly, legally and equitably entitled.

What is claimed:

1. A carton blank feeding and shuttle machine, comprising:

a first driven belt supported by a first plurality of pulleys attached to a first side and a second driven belt supported by a second plurality of pulleys attached to an opposing second side;

a first rod attached to the first driven belt and a second rod attached to the second driven belt, each of the first and second rods extending across the first and second opposing sides;

at least one controller for controlling movements of (a) the first driven belt and (b) the second driven belt; and a plucking head supported by the first and second rods such that common motion of the first and second driven belts moves the plucking head along a transport path between an initial position from which the plucking head engages a carton blank and an intermediate position from which the plucking head disengages the carton blank.

2. The carton blank feeding and shuttle machine of claim 1, wherein the plucking head is further supported by the first and second rods such that relative motion of the first and second driven belts extends the plucking head from a first position to a second position from which the plucking head engages the carton blank.

3. The carton blank feeding and shuttle machine of claim 2, wherein the first and second driven belts may be driven such that the plucking head extends from the first position to the second position while moving along the transport path between the intermediate position and the initial position.

4. The carton blank feeding and shuttle machine of claim 2, wherein the first and second driven belts may be driven such that the plucking head retracts from the second position to the first position while moving along the transport path between the initial position and the intermediate position.

5. The carton blank feeding and shuttle machine of claim 1, wherein a first end of the first rod is attached to the first driven belt, a first end of the second rod attached to the second driven belt, and a second end of the first rod is supported for movement relative the first end of the first rod and a second end of the second rod is supported for movement relative the first end of the second rod.

6. The carton blank feeding and shuttle machine of claim 1, wherein the plucking head includes at least one linkage assembly supported by the first and second rods.

7. The carton blank feeding and shuttle machine of claim 1, wherein the plucking head includes first and second linkage assemblies supported by the first and second rods, and wherein a support bar extends between the first and second linkage assemblies and supports at least one vacuum cup attached to first and second supports associated with each linkage assembly.

8. A carton blank erector, comprising:

a frame supporting at least one of a carton former, a hopper supporting a plurality of cartons, a take-away conveyor, and a feeding and shuttle machine, the feeding and shuttle machine including (a) a first driven belt supported by a first plurality of pulleys attached to a first side and a second driven belt supported by a second plurality of pulleys attached to an opposing second side, (b) a first rod attached to the first driven belt and a second rod attached to the second driven belt, each of the first and second rods extending across the first and second opposing sides, and (c) a plucking head supported by the first and second rods such that common motion of the first and second driven belts moves the plucking head along a transport path between an initial position from which the plucking head engages a carton blank and an intermediate position where the plucking head disengages the carton blank; and at least one controller for controlling movements of (a) the first driven belt and (b) the second driven belt.

9. The carton blank erector of claim 8, wherein the plucking head is further supported by the first and second rods such that relative motion of the first and second driven belts extends the plucking head from a first position to a second position where the plucking head engages the carton blank.

10. The carton blank erector of claim 8, wherein the plucking head includes at least one linkage assembly supported by the first and second rods and the at least one linkage assembly supports at least one vacuum cup.

11. A carton blank feeding and shuttle machine, comprising:

a first driven belt supported by a first plurality of pulleys attached to a first side and a second driven belt supported by a second plurality of pulleys attached to an opposing second side;

a first rod attached to the first driven belt and a second rod attached to the second driven belt, each of the first and second rods extending across the first and second opposing sides;

at least one controller for controlling motions of (a) the first driven belt and (b) the second driven belt; and a plucking head supported by the first and second rods such that the first and second driven belts create common motion to move the plucking head along a transport path and relative motion to extend and retract the plucking head.

12. The carton blank feeding and shuttle machine of claim 11, wherein the common motion moves the plucking head along a reciprocating transport path between an initial position from which the plucking head engages a carton blank and an intermediate position from which the plucking head disengages the carton blank.

13. The carton blank feeding and shuttle machine of claim 12, wherein the relative motion extends the plucking head from a first position to a second position from which the plucking head engages a carton blank.

14. The carton blank feeding and shuttle machine of claim 13, wherein the first and second driven belts may be driven such that the plucking head extends from the first position to the second position while moving along the transport path between the initial and intermediate positions.

15. The carton blank feeding and shuttle machine of claim 13, wherein the first and second driven belts may be driven such that the plucking head retracts from the second position to the first position while moving along the transport path between the initial and intermediate positions.

16. The carton blank feeding and shuttle machine of claim 11, wherein a first end of the first rod is attached to the first driven belt, a first end of the second rod attached to the second driven belt, and a second end of the first rod is supported for movement relative the first end of the first rod and a second end of the second rod is supported for movement relative the first end of the second rod.

17. The carton blank feeding and shuttle machine of claim 11, wherein the plucking head includes at least one linkage assembly supported by the first and second rods.

18. The carton blank feeding and shuttle machine of claim 11, wherein the plucking head includes first and second linkage assemblies supported by the first and second rods, and wherein a support bar extends between the first and second linkage assemblies and supports at least one vacuum cup attached to first and second supports associated with each linkage assembly.

19. The carton blank feeding and shuttle machine of claim 18, wherein the relative motion extends the plucking head from a first position to a second position from which the vacuum cup engages a carton blank.

20. A carton blank feeding and shuttle machine of claim 11, further comprising a first drive supported by the first side for moving the second driven belt and a second drive supported by the second side for moving the first driven belt.

* * * * *